United States Patent Office 3,519,920
Patented July 7, 1970

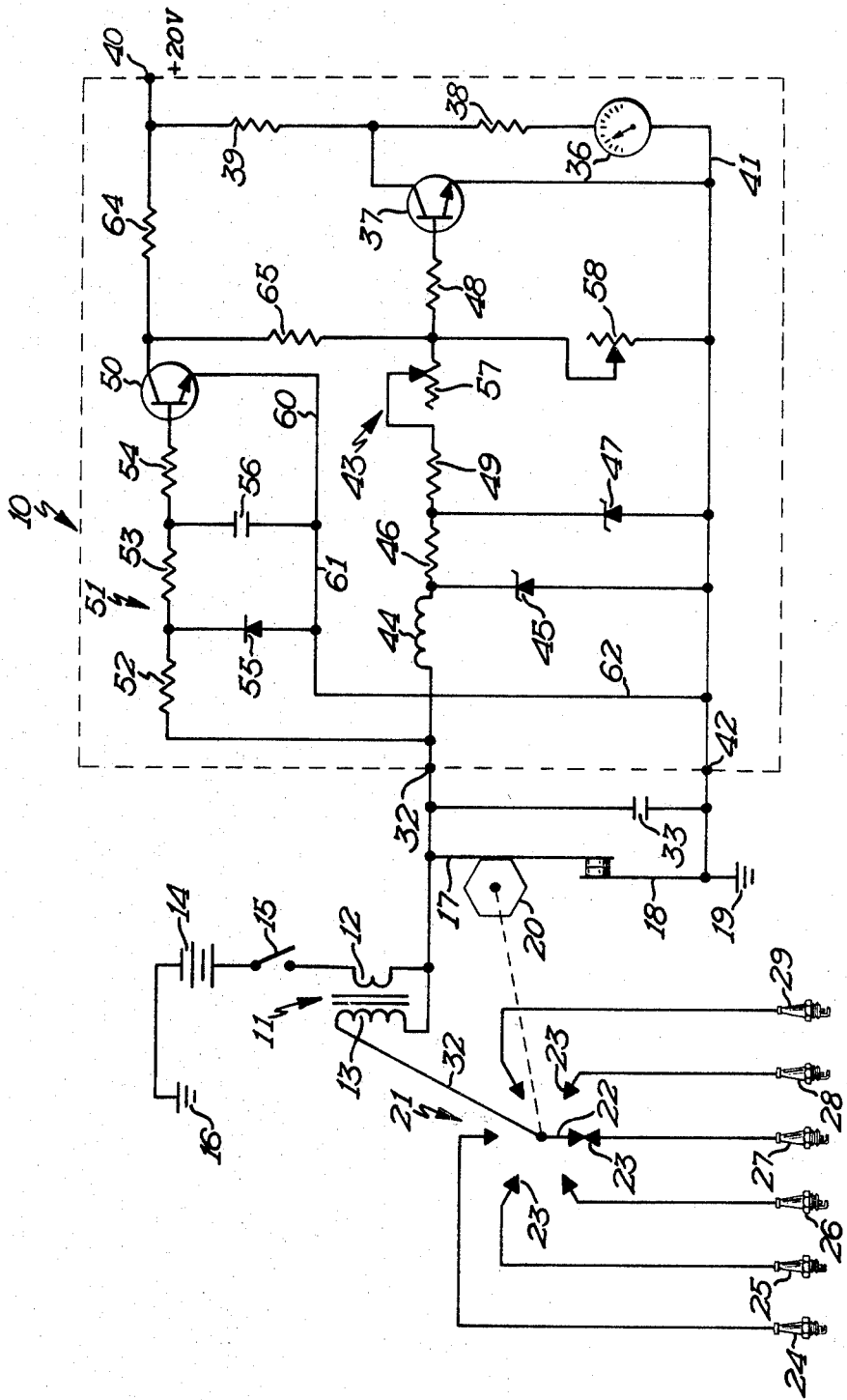

3,519,920
APPARATUS FOR MEASURING RESISTANCE ACROSS PERIODICALLY OPERATING ENGINE IGNITION SWITCH
Sydney J. Roth, Edina, Minn., assignor to Marquette Corporation, Minneapolis, Minn., a corporation of Delaware
Filed Apr. 10, 1968, Ser. No. 720,297
Int. Cl. G01m 15/00
U.S. Cl. 324—16                                    8 Claims

ABSTRACT OF THE DISCLOSURE

Apparatus for measuring the resistance across the distributor breaker points of an internal combustion engine while the engine is running which includes a meter connected across a transistor, which transistor alternately has applied to its input terminals voltages dependent upon the voltages across the points during points open and points closed conditions, there being an auxiliary circuit for applying a predetermined biasing voltage to the transistor while the points are closed.

BACKGROUND OF THE INVENTION

In analyzing the performance of an internal combustion engine, it is desirable to measure the resistance existing across the distributor breaker points while they are closed. This indicates whether the points are in good shape or are sufficiently so "pitted" that they should be replaced. The usual way in which this has been done is for the engine to be slowly advanced by successive energizations of the starting motor until the points are closed and then measure the resistance across the points. This takes considerable time and it is desirable for this test to be performed while the engine is running. Not only is the test more quickly performed while the engine is running but it is also a more realistic test in that it is the resistance across the points while the engine is running that determines the actual performance of the points. Furthermore, in analyzing the performance of an internal combustion engine, it is customary through appropriate engine analyzing equipment to perform various tests while the engine is running. If the resistance across the distributor points can be measured at the same time, this facilitates the testing procedure.

SUMMARY OF THE INVENTION

The present invention is concerned with apparatus for measuring while the engine is running, the resistance across a switch, such as the conventional distributor breaker switch, which is sequentially opened and closed to produce voltage pulses to the igniters. Broadly, this is accomplished by providing some electrically operated indicating device such as a meter and controlling the energization of this indicating device by an electric amplifier which has successively applied to its input terminals an adjustable fixed signal any time that the ignition switch is open and each time the ignition switch is closed, a signal dependent upon the resistance across the ignition switch.

Where the indicating device is a meter, it has sufficient inertia compared to the frequency of the operation of the ignition switch that the meter provides a relatively constant reading indicative of the average energization thereof.

It is desirable that, in order to provide an adequate range of readings, the reading of the indicating device be higher when the resistance across the points is relatively low, as is the case with points in proper condition. With such a provision, the reading of the meter can vary about a median position corresponding to that assumed when the ignition points are open. If the points are good, the reading of the meter will be higher and if the points are very bad, the reading of the meter will be lower than this normal value. In this way, it is possible for the mechanic to readily determine the condition of the points while the engine is running.

In order to enable the relatively small voltage across the points to be adequately sensed, the apparatus provides a biasing voltage for the electronic amplifier which is applied only while the points are closed. The biasing voltage is effectively switched on and off by an electronic switching device which, in turn, is controlled by a voltage derived from that across the ignition switch or "points."

Further details and objects of the invention will be apparent from the consideration of the accompanying specification, claims and drawing.

BRIEF DESCRIPTION OF THE DRAWING

The single figure of the drawing shows my improved engine testing apparatus in schematic form, the apparatus being shown as connected across the distributor points of a conventional ignition system which likewise is shown in schematic form.

DESCRIPTION OF THE PREFERRED EMBODIMENTS

The testing apparatus as shown schematically is located within a housing 10 shown in dotted lines. The apparatus within the housing 10 is connected by suitable detachable connections to a conventional ignition system. Referring first to this ignition system, the numeral 11 indicates the usual ignition coil having a low voltage primary winding 12 and a high voltage secondary winding 13, the low voltage primary winding 12 being connected to the positive terminal of the automobile battery 14 through some switch such as the conventional ignition switch 15. The opposite terminal of battery 14 is connected to ground at 16. The lower terminal of the primary winding 12 is connected to a switch blade 17 which cooperates with the second switch blade 18 to form the conventional distributor breaker points. Switch blade 18 is grounded at 19. Cooperating with switch blade 17 is a 6-sided cam 20 which serves to separate switch blades 17 and 18 six times for each revolution of cam 20. It is of course understood that if an 8-cylinder engine were being employed, the cam 20 would be 8-sided. The numeral 21 indicates a conventional distributor having a distributor arm 22 which is driven by the engine along with cam 20 and which sequentially makes contact with a plurality of terminals 23, each of which is connected to a different one of the igniters 24 through 29, which igniters normally take the form of conventional spark plugs. The various igniters 24 through 29 are associated with the respective cylinders, igniter 24 being associated with cylinder No. 1, for example. While I have shown the igniters or spark plugs as located in a continuous row, it is to be understood that they are associated with cylinders in such a manner as to produce the desired firing sequence. The rotative arm 22 of the distributor 21 is connected in the conventional manner to the high tension side or upper terminal of coil 13 through a conductor 32. Upon rotation of the distributor arm 22, the voltage across coil 13 is successively applied to the various igniters or spark plugs in the desired firing sequence. Connected across the points 17 and 18 is a capacitor 33 through which the voltage from the igniter passes each time that the points 17 and 18 are open and the distributor arm 22 is connected to one of the terminals 23.

Turning now to the improved testing apparatus, this comprises an electrically operated indicating device, specifically an electrical meter, designated by the reference numeral 36. The energization of this meter is controlled by an NPN transistor 37, the collector and the emitter terminals of which are connected across the meter 36 through a resistor 38. The conductivity of transistor 37 and hence the reading of meter 36 is successively determined by the value of a standard voltage derived from the voltage across the points 17 and 18 while they are open, and a variable voltage based upon the voltage across the points 17 and 18 while they are closed. In this way, the meter 36 assumes an average value dependent upon the the resistance across the points while they are closed.

Referring first to the manner in which the transistor 37 controls the energization of meter 36, the upper terminal of meter 36 is connected through resistor 38, as previously referred to, and a resistor 39 to a terminal 40 adapted to be connected to the positive terminal of a suitable source of direct current voltage such as a 20-volt source. The lower terminal of meter 36 is connected to a ground conductor 41, the emitter of transistor 37 is also connected to a ground conductor 41, while a collector transistor 37 is connected to the upper terminal of resistor 38. It will be readily apparent from the above description that the meter 36 is connected across the 24-volt power supply in series with resistors 38 and 39, and the output circuit of transistor 37 is connected in parallel with the meter 36 and resistor 38. Thus, the higher the conductivity of the collector-emitter circuit of transistor 37, the less will be the energization of meter 36 and hence the lower will be its reading.

Referring now to the means of controlling the conductivity of transistor 37, the signal for controlling this conductivity is derived from the voltage across the distributor ignition switch or, in other words, the breaker points 17 and 18. The box 10 housing the testing equipment has a pair of input numerals 32 and 42 which are adapted to have suitable leads connected to them, such leads being connected across the points 17 and 18 in any suitable manner. If desired, detachable clips may be employed for effecting such connection. The result of this connection is that the voltage applied across terminals 32 and 42 is the voltage existing across the points 17 and 18. With the main ignition switch 15 closed, this voltage is relatively high when ignition points are open, being based upon the voltage of battery 14. When the points are closed, this voltage is relatively small if the points are in good condition. The voltage across input terminals 32 and 42 is passed through a network generally indicated by the reference numeral 43. This network comprises an inductor 44, a Zener diode 45, a resistor 46, a second Zener diode 47, a fixed resistor 49, rheostats 57 and 58, and a fixed resistor 48.

Referring to the operation of network 43, when the voltage applied to terminals 32 and 42 is the voltage which exists when ignition points 17 and 18 are open, this voltage is effectively applied across the voltage divider including the inductor 44, and the Zener diode 45. The Zener diode has a maximum voltage drop thereacross of a predetermined value such as 5.6 volts. Hence, the remaining portion of the voltage drop across the ignition points, while the points are open, occurs through the inductor 44. The inductor 44, furthermore, serves to block any high voltage transients. The result is that the resultant voltage which is passed on in the next stage of the network is the relatively low DC voltage occurring across the Zener diode 45. This voltage is in turn applied to a further voltage divider network including resistor 46 and a further Zener diode 47. Zener diode 47 has a maximum voltage drop thereacross lower than that of diode 45, such as 3.3 volts. Thus the DC voltage applied to the next stage of the network is still lower. This voltage is, in turn, applied to a further voltage divider network consisting of the fixed resistor 49 and the two rheostats 57 and 58 which are suitably adjusted to apply a selected portion of this voltage across the opposite terminals of the rheostat 58. This voltage is in turn applied through resistor 48 between the base and emitter of transistor 37 to cause a predetermined current flow to occur therethrough. Due to the fact that the voltage drops across Zener diodes 45 and 47 are constant, regardless of any variations in the voltage across points 17 and 18 while the points are open, the current flow between the base and emitter will be at a constant value depending upon the adjustments of rheostats 57 and 58. The rheostats 57 and 58 are preferably adjusted so that under these conditions, the pointer of the meter assumes an intermediate position on the scale.

When the points 17 and 18 are closed, it will be obvious that the voltage applied to terminals 32 and 42 is relatively low as compared with that which exists when they are open. Under these conditions, the Zener diodes 45 and 47 will be ineffective since for this low voltage, they effectively present an open circuit. The voltage which would be applied between the base and emitter of transistor 37 when the points are closed would, in the absence of further means, be so slight as not to initiate current flow between the base and emitter. In other words, the signal would be below the threshold level of the transistor 37. In order to enable this relatively slight voltage to control the transistor 37, I provide further means for positively biasing the base during the periods in which the points are closed. This is accomplished by a further transistor 50 and a further network 51. The network 51 comprises three resistors 52, 53 and 54, a diode 55, and a capacitor 56. The function of diode 55 is to bypass any negative components of the voltage applied to the input terminals 32 and 42. The voltage existing across the open points of an ignition system has oscillatory components and the general purpose of the network 51 is to insure that the voltage applied to the input terminals of transistor 50 is a square wave voltage. The condenser 56 serves to bypass any high frequency components that might be present in the main voltage across the points.

The resultant effect of network 51 is, as stated above, to apply a square wave voltage between the base and emitter of transistor 50, the polarity of this voltage being such that the base is positive with respect to the emitter as long as the points are open. Under these conditions, the transistor is highly conductive and the collector of transistor 50 is effectively connected through the emitter and conductors 60, 61 and 62 to ground. The collector is connected through a resistor 64 to a positive terminal 40 and also through a resistor 65 and resistor 48 to the base of transistor 37. During the time transistor 50 is highly conductive as just described, the effect of the connection from the power supply terminal 40 through resistors 64, 65 and 48 to the base of transistor 37 is negligible due to the fact that the junction of resistor 64 and resistor 65 is effectively tied to ground through the collector-emitter circuit of transistor 50 just traced. Thus, during the time that the points 17 and 18 are disengaged, the voltage applied to the base of transistor 37 is almost entirely determined by the network 43 in the manner previously described.

When, however, the points are closed so that a negligible voltage is applied to the base of transistor 50, transistor 50 is relatively nonconductive and the connection of the base of transistor 37 to the positive terminal 40 is effective under these conditions to apply a substantial positive bias to the base of transistor 37. This positive bias is sufficient to cause transistor 37 to become conductive and the degree of conductivity of transistor 37 is determined by this fixed voltage plus the variable voltage across the switch members 17 and 18 when the "points" are closed. Thus, transistor 37 is conductive to a degree dependent upon the voltage across the points while closed. The meter 36 assumes a position dependent upon this voltage and it will be obviously apparent that the smaller the voltage across points 17 and 18 the less will be the conductivity of transistor 37 and the higher the reading of meter 36. When, however, the points are in poor condition so that the resistance across them is relatively high when they are closed, the transistor 37 will be more conductive and a lower meter reading will result.

The apparatus is so designed that for points which are not in perfect condition but reasonably satisfactory, the meter 36 will have substantially the same reading as it does when the points are open. Or, stated another way, the combined effect of the voltage as measured across the points while they are closed along with the biasing voltage, introduced through the connection of base of transistor 37 to the positive terminal 40 is substantially equal to the attenuated voltage derived from the voltage across the points while they are open, this attenuation due in part to the Zener diodes 45 and 47.

The meter has sufficient inertia that it will tend to assume a relatively steady position which steady position is intermediate the position it assumes when the points are open and the position it assumes when the points are closed. This is true because the inertia of the meter is relatively large as compared with the frequency at which the points are operated. Thus, it will be seen that with my apparatus, the meter 36 assumes a value dependent upon the resistance across the switch blades 17 and 18, this condition being measured while the engine is running.

While the values of the particular components are not critical to the invention, I have found it desirable in one particular embodiment of my invention to employ the following values for the various components:

Resistors—
    38—18 kilohms
    39—1 kilohm
    46—2.2 kilohms
    48—2.2 kilohms
    49—680 ohms
    52—3 kilohms
    53—2.2 kilohms
    54—2.2 kilohms
    64—6.8 kilohms
    65—22 kilohms
Rheostats—
    57—5 kilohms
    58—5 kilohms
Zener diodes—
    45—5.6 volts
    47—3.3 volts
Inductors—
    44—25 microhenries
Capacitor—
    56—.15 microfarad
Transistors—
    37—2N3414
    50—2N3566

CONCLUSION

It will be seen that I have developed a relatively simple apparatus for measuring the resistance across a switch, such as the conventional distributor breaker switch, which is sequentially opened and closed to produce voltage pulses for the igniters. With my apparatus this can readily be accomplished while the engine is running. It will be further seen that with my apparatus, the indicating meter has a wide range of readings depending upon the condition of the ignition switch.

While I have shown a specific embodiment of my invention, it is to be understood that this is only for purposes of illustration and the scope of my invention is to be limited solely by the appended claims.

I claim as my invention:

1. Testing apparatus for use with an internal combustion engine having an igniter for igniting the fuel and voltage pulse producing means for producing and applying to the igniter voltage pulses, said voltage pulse producing means comprising an ignition switch which is sequentially opened and closed by operation of the engine, said testing apparatus being employed to determine the resistance across the ignition switch when closed without stopping the operation of the engine and comprising:

an electrically operated indicating device capable of varying degrees of indication dependent upon the energization thereof, means for controlling the energization of said indicating device including an electronic amplifier having input terminals and output terminals connected to said indicating device, said electronic amplifier being of a type in which the current flow between the output terminals assumes various intermediate values between no current flow and maximum current flow dependent upon the magnitude of signal applied to the input terminals, apparatus input terminals for connection across the ignition switch of the engine being tested, first signal producing means connected to said apparatus input terminals and effective when said apparatus input terminals are connected to such an ignition switch to apply an adjustable fixed signal to said amplifier input terminals each time that said ignition switch is open, said fixed signal being of a magnitude to cause a value of current flow between said output terminals such as to tend to cause said indicating means to assume a predetermined degree of indication, and second signal producing means connected to said apparatus input terminals and effective when the apparatus input terminals are connected to the ignition switch to apply to said amplifier input terminals each time that said ignition switch is closed a signal dependent upon the resistance across said ignition switch and of a varying magnitude such that the current flow between said output terminals is of an intermediate value such as to tend to cause said indicating means to assume an intermediate degree of indication dependent upon the resistance across the ignition switch.

2. The testing apparatus of claim 1 in which said electronic amplifier is a transistor.

3. The testing apparatus of claim 1 in which said indicating device is a meter with sufficient inertia as compared with the frequency of operation of said ignition switch that said meter provides a relatively constant reading indicative of the average energization thereof.

4. The testing apparatus of claim 1 in which said indicating device is energized to a lower extent when said ignition switch is open than when said ignition switch is closed and the resistance thereacross has a desired value.

5. The testing apparatus of claim 1 in which said second signal producing means includes means for producing a biasing signal to increase the total value of signal applied to said amplifier input terminals when the ignition switch is closed and in which there is an electronic switching device and means connected to said apparatus input terminals for causing said electronic switching device to render said biasing signal ineffective each time that said ignition switch is open.

6. The testing apparatus of claim 5 in which the electronic switching device controlling the biasing signal has applied thereto a square wave signal derived from the voltage across the ignition switch.

7. The testing apparatus of claim 1 in which the adjustable fixed signal applied to the amplifier input terminals when the ignition switch is open is derived from the voltage across the switch when open and in which there is means for reducing the magnitude of said signal to a predetermined value.

8. The testing apparatus of claim 7 in which the means for reducing the magnitude of said signal comprises an impedance of the type having a constant voltage drop thereacross.

References Cited
UNITED STATES PATENTS

| | | | |
|---|---|---|---|
| 3,061,772 | 10/1962 | Makuh | 324—16 |
| 3,275,932 | 9/1966 | Parmater | 324—16 |

OTHER REFERENCES

A. M. Schotz, Check Auto Ignition with an Ohm-Dwell-Tachometer, Radio Electronics, June, 1962, pp. 32–34.

RUDOLPH V. ROLINEC, Primary Examiner

M. J. LYNCH, Assistant Examiner